United States Patent
Sanders et al.

(10) Patent No.: US 10,299,067 B2
(45) Date of Patent: May 21, 2019

(54) TRIGGERING EXTERNAL SERVICES BASED ON GEO-LOCATION AND TIME

(71) Applicants: Bjoern Sanders, Schifferstadt (DE); Thomas Angermayer, Stetten (DE)

(72) Inventors: Bjoern Sanders, Schifferstadt (DE); Thomas Angermayer, Stetten (DE)

(73) Assignee: SuccessFactors, Inc., South San Francisco, CA (US)

( * ) Notice: Subject to any disclaimer, the term of this patent is extended or adjusted under 35 U.S.C. 154(b) by 0 days.

(21) Appl. No.: 14/578,069

(22) Filed: Dec. 19, 2014

(65) Prior Publication Data

US 2016/0183041 A1 Jun. 23, 2016

(51) Int. Cl.
| | |
|---|---|
| *H04W 4/02* | (2018.01) |
| *H04W 4/021* | (2018.01) |
| *G06Q 30/02* | (2012.01) |
| *G06Q 10/10* | (2012.01) |
| *H04W 4/21* | (2018.01) |

(52) U.S. Cl.
CPC .......... *H04W 4/02* (2013.01); *H04W 4/021* (2013.01); *H04W 4/027* (2013.01); *G06Q 10/10* (2013.01); *G06Q 30/0267* (2013.01); *G06Q 30/0269* (2013.01); *H04W 4/21* (2018.02)

(58) Field of Classification Search
CPC ...... H04Q 7/20; G06Q 10/1091; G06Q 10/06; G06Q 10/10; G06Q 10/00; G06Q 10/063114; G06Q 30/0267; G06Q 30/0269; H04W 4/021; H04W 4/02; H04W 4/04; H04W 64/00; H04W 4/023
See application file for complete search history.

(56) References Cited

U.S. PATENT DOCUMENTS

| | | | | |
|---|---|---|---|---|
| 7,096,030 | B2 * | 8/2006 | Huomo | H04W 4/02 455/412.1 |
| 9,020,848 | B1 * | 4/2015 | Ridge | G06Q 40/125 705/32 |
| 9,113,309 | B2 * | 8/2015 | Uilecan | G06Q 10/109 |
| 2007/0198988 | A1 * | 8/2007 | Kumar | G06F 9/546 719/313 |
| 2009/0085728 | A1 * | 4/2009 | Catten | H04K 3/415 340/425.5 |
| 2015/0327011 | A1 * | 11/2015 | Fairbanks | G07C 1/10 455/456.3 |
| 2015/0363745 | A1 * | 12/2015 | Hatch | G06Q 10/1091 705/32 |
| 2016/0042470 | A1 * | 2/2016 | Shaaban | G06Q 40/12 705/30 |

* cited by examiner

*Primary Examiner* — Olumide Ajibade Akonai
(74) *Attorney, Agent, or Firm* — Mintz Levin Cohn Ferris Glovsky and Popeo, P.C.

(57) ABSTRACT

There is provided a method. The method may include selecting a rule defined by one or more of a location, a time, or other factor stored in a database. The method may further include selecting an external service to be triggered by application of the rule to one or more of a current location, a current time, or current other factor at a mobile station. The method may include determining the current location of the mobile station, applying the selected rule to the one or more of the current location, the current time, and a current value of other factor, and/or triggering the external service based on the applying the selected rule.

12 Claims, 3 Drawing Sheets

TRIGGERING EXTERNAL SERVICES BASED ON GEO-LOCATION AND TIME

FIELD

The subject matter described herein relates to triggering services based on the location of a mobile station.

BACKGROUND

The separation between work and private life is becoming less and less clear. People are working longer and harder than in previous generations. Along with more work, people are working in locations outside a typical office setting. Fortunately, the modern cellular and wireless capabilities of mobile devices has also increased. Increased access to work related data has increased worker efficiency. Increased efficiency in the personal lives of employees may be needed to support further increases in worker productivity.

SUMMARY

There is provided a method. The method may include selecting a rule defined by one or more of a location, a time, or other factor stored in a database. The method may further include selecting an external service to be triggered by application of the rule to one or more of a current location, a current time, or current other factor at a mobile station. The method may include determining the current location of the mobile station, applying the selected rule to the one or more of the current location, the current time, and a current value of other factor, and/or triggering the external service based on the applying the selected rule.

In some variations, one or more of the features disclosed herein including the following features can optionally be included in any feasible combination. The external service may include one or more of a text message, an email, or a voice call. The selected rule may include comparing a physical location on earth stored in the database to the current location of the mobile station, and applying the selected rule may cause the external service to be triggered. The selected rule may include comparing a stored time in the database to the current time at the mobile device, and applying the selected rule may cause the external service to be triggered. The state of the other factor may includes a speed, and the selected rule may include comparing a stored speed in the database to the current value of the other factor at the mobile device, and applying the selected rule may cause the external service to be triggered. The mobile station may be a user equipment of a wireless access network, and the database may be located at a network node of the wireless access network.

Figure 1:
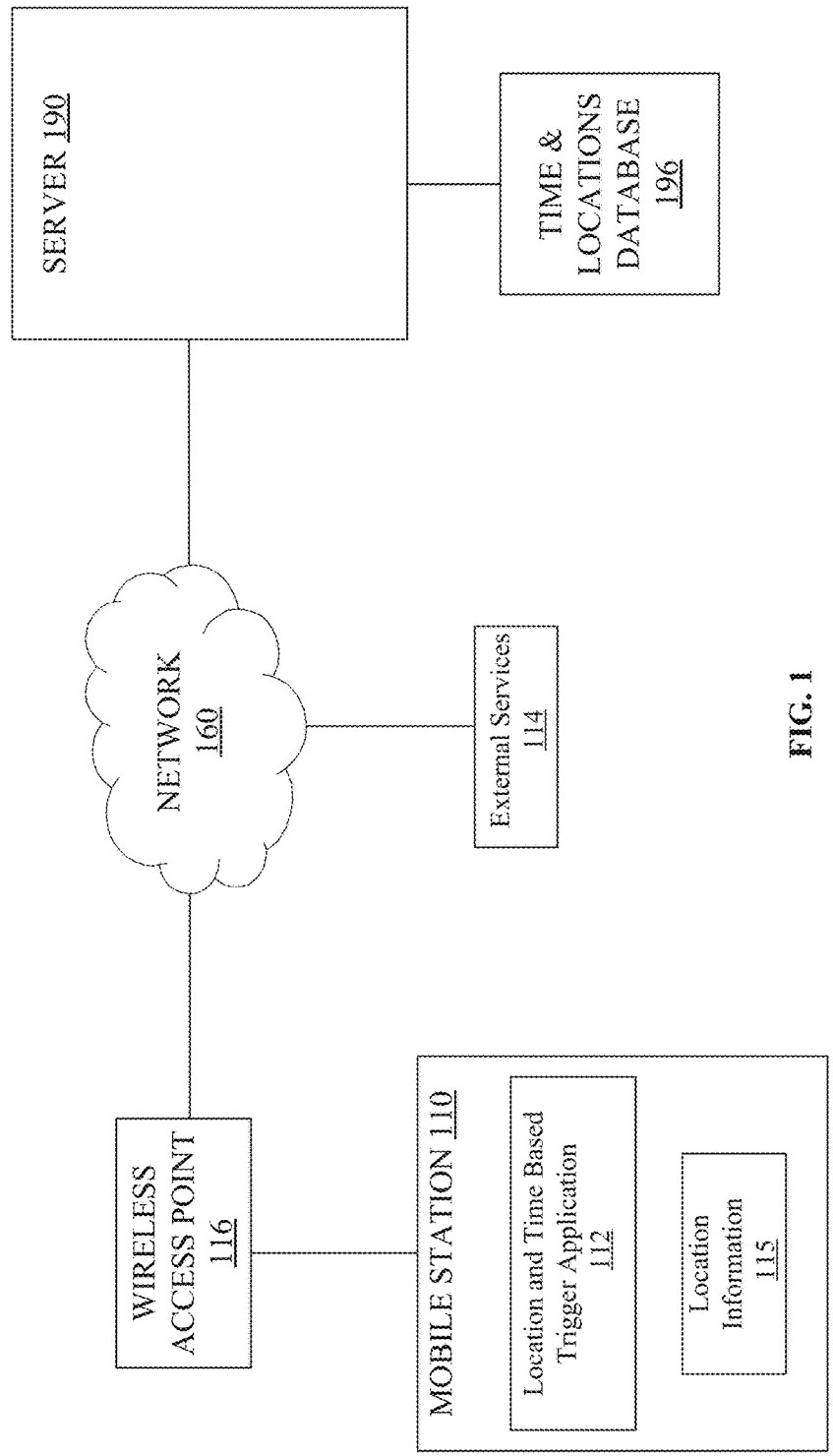
FIG. 1 depicts a system, in accordance with some implementations.

Like labels are used to refer to the same or similar items in the drawings.

DETAILED DESCRIPTION

Many people do not work in a traditional office and may work at home, another location, or at a combination of locations. Many people also carry a mobile station (or mobile device) such as a cell phone, smartphone, or other mobile station that has cellular data service over a wide geographic area or network access via a WiFi wireless access point or other wireless network.

Many mobile stations are capable of determining the geo-location of the mobile station. For example, many mobile stations have an embedded global positioning system (GPS) receiver that may determine the location of the mobile station. Some mobile stations may determine their location using information from one or more WiFi or cellular wireless access points. For example, a mobile station may use received signal strengths from one or more indoor wireless access points to determine the indoor location of a mobile station and GPS to determine the outdoor location of the mobile station.

The precision of determining geo-location has been increasing in recent years and may improve further in the future. The reliability of location information has also improved over recent years. Location may be determined to a precision to one meter or less with relatively high reliability. As location precision improves and the reliability of location information improves, geo-location may be used more and more in private and business applications.

In some implementations, an application on a mobile station may cause an external service to be triggered based on at least the location of the mobile station. For example, an application on an employee's mobile station may cause the employee to be periodically clocked-in when they employee arrives at the employer's office building. The application may also cause the employee to be periodically clocked-out when the employee leaves the office building. In another example, time may be included when determining whether to trigger the external service. For example, time and location may trigger an external service such as sending a text message to the employee's spouse when the employee leaves the office location and the time is 5:00 P.M., or later. Other factors may be included in determining whether to trigger an external service, and other external services may be triggered.

The application on the employee's mobile station may determine whether to trigger the external service based on one or more rules. The one or more rules may include data values stored in a database and current or present values at the mobile station. Continuing the above example, the GPS location of the employee's office and the time of 5:00 P.M. may be stored in the database. An example of a rule may include triggering the external service of a texting service to a predetermined telephone number for the employee's spouse when the employee moves away from the location of the office building and the time is after 5:00 P.M. A rule may be stored at the database or at the mobile station.

FIG. 1 depicts a system 100 for triggering external services 114 by location and time based trigger application 112 (also referred to herein as "application 112") using location information 115 of mobile station 110, in accordance with some implementations. The system 100 may include server 190, coupled to network 160, which in turn may be coupled to mobile station 110 via wireless access point 116. External services 114 may also be coupled to network 160. The server 190 may be coupled to time and location database 196, where locations, times, conditions, rules, and other factors are stored for application 112 to determine whether to trigger one or more external service.

Mobile station 110 may be implemented as a mobile wireless device, although at any given time the mobile station 110 may be stationary. The mobile station 110 may be referred to as, for example, a mobile device, user equipment, mobile unit, subscriber station, wireless terminal, terminal, tablet, netbook computer, laptop computer and/or any other wireless device. Moreover, the mobile station may also be implemented as, for example, a wireless handheld device, a wireless plug-in accessory, or the like. For example, the mobile station may take the form of a cellular phone, or the like. In some instances, the mobile station may include one or more of the following: at least one processor, at least one computer-readable storage medium (e.g., memory, storage, and the like), at least one user interface, and at least one radio access mechanism.

Mobile station 110 includes location information 115. Many mobile stations 110 are capable of determining the location of the mobile station 110. For example, many mobile stations have an embedded global positioning system (GPS) receiver that may determine the location of the mobile station. However, GPS may be unreliable in some indoor environments. Some mobile stations may be able to determine their indoor location (or outdoor location) using information from one or more wireless access points. For example, a mobile station may use received a signal strength from one or more wireless access points, such as a WiFi wireless access point to determine its indoor location. Location may be determined using other methods as well such as the use of beacons that relay location information to the mobile station 110. The location of the mobile station 110 may be determined by the foregoing methods, a combination of the foregoing methods, or any other method of determining the location of a mobile station/wireless device.

Mobile station 110 may include application 112. Application 112 may cause an external service to be triggered based on one or more rules. The one or more rules may include data values stored in time and locations database 196 and current or present value of location at the mobile station 110. For example, a rule may trigger clocking-in an employee into a timekeeping system when the employee arrives at the employer's office building. The application may also cause the employee to be clocked-out of the timekeeping system when the employee leaves the office building. Rules may include other factors such as time. For example, time may be included when determining whether to trigger the external service. For example, time and location may trigger an external service such as sending a text message to the employee's spouse when the employee leaves the office location and the time is 5:00 P.M., or later. To further illustrate the use of time in a rule, when the employee departs the office location at a time earlier than 5:00 P.M., the employee may not be clocked-out because the employee may be departing for a work related activity. In another example, the events on the employee's electronic calendar may be used to determine if the employee is leaving for a work related or personal reason. For example, if the employee has scheduled a "meeting with client" at 5:20 P.M., the application may determine that the employee should not be clocked-out when leaving the office location and to not text the employee's spouse that they are leaving for home.

Other factors may be included in the rules used to determine whether to trigger an external service. For example, an employee may configure a rule to send travel updates to a business associate while the employee is travelling. For example, an employee travelling to a client's facility 200 km away may configure a rule to send a text or email to the client at predetermined distances from the client's facility. For example, the employee may configure a rule to send a text to the client when the employee is 150 km from the client's facility, another text when the employee is 100 km away, another text when the employee is 50 km away and a final text when 10 km from the facility. The rule may cause the text to contain the distance, GPS location, time, and/or other information. Another rule may be configured to trigger an external service at predetermined time intervals. In another example, when the employee is travelling above or below a particular speed an external service may be triggered. For example, if the speed of the mobile station 110 exceeds a speed, a rule may cause an external service such as sending a text message to the employer. As the above-noted examples illustrate, rules may be applied to the current location, current time, and other factors at the mobile station 110 to automatically to trigger one or more external services.

In some implementations, application 112 may be configured by the employee or user. For example, the employee may configure to send a text message to the employee's spouse when they leave the office building. Some features may be configurable only by the employer. For example, an employer may configure clocking-in and out and the employee may not be allowed to make changes to any related rules. In some implementations, application 112 may be configured via direct data entry and/or via a web page or web server.

External services 114 may include sending a text message, sending an email message, making or voice call and providing automated information such as distance, time, location, and so on. External services may include interfaces to a landline telephone system, a satellite system, an analog cellular telephone system, and a proprietary messaging system. Any other external service, communication, or data storage may also be used.

Mobile station 110 may connect through a wireless access point and network to enterprise resource planning ("ERP") system. For example, server 190 may host an ERP system. Businesses may rely on business ERP systems and other software to assist them in performing various tasks. The day-to-day operations of a business may include a multitude of tasks such as timekeeping, purchasing, sales, payroll, accounting, benefits administration, security, maintenance, and various other tasks that businesses need to perform. In some implementations, location based timekeeping may be incorporated into an ERP system.

Time and locations database 196 (also referred to herein as "database 196") may include data storage in a disk drive, solid-state disk, local memory, or the cloud. Times stored may include times that may be used in rules for triggering external services. For example, a time such as 8:00 A.M. may be stored to indicate an anticipated clocking-in time, 12:00 P.M. may be stored as a time to indicate a lunch break, 5:00 P.M. may be stored as an end time for the employee's working hours. One or more tolerances for the stored values may also be stored in database 196. For example, 30 minutes may be stored as a tolerance time. The tolerance time may be used to cause a rule including a stored time to be satisfied when the current time is within the tolerance time of the stored time. In the previous example, if the employee departed the office location at 5:20, the employee would be clocked-out because the departure time is within the tolerance time (30 min.) of the stored time of 5:00 P.M. In another example, a rule may be configured that whenever an employee arrives or leaves within the tolerance time of a start/end/break time, the employee is believed to be arriving/taking a break/departing and is clocked-in or out as appropriate. Locations may be stored at database 196 including a location of one or more offices, clients, residences, and so on. The stored locations may be included in the rules. For example, a stored office location may be used in a rule related to clocking-in and out an employee based on the employee's location. Locations may have a tolerance distance. For example, a tolerance distance may be 100 m. In this example, when an employee is at the office location within the tolerance distance, a location condition of a rule may be satisfied. Other factors and data may also be stored at database 196.

Network 160 may include any type of wired network, wireless network, or combination of the two. For example, network 160 may comprise one or more of the following: a cellular telephone network (2G/3G/4G/5G, and so on), a wireless network (WiFi, WiMax, and so on), a public switched telephone network (PSTN), the Internet, a public land mobile network (PLMN), and the like.

Wireless access point 116 may provide wireless access to a public land mobile network and/or a wireless local area network. For example, the wireless access point 116 may be implemented as a cellular base station of a public land mobile network and/or as a wireless access device (e.g., a Wi-Fi or WiMax wireless access point) providing access to a wireless network. Wireless access point 116 may provide wireless network service to mobile station 110.

Server 190 may comprise a computer system with a wired or wireless interface to network 160 and in some implementations an interface to database 196. The computer system may comprise at least one processor, at least one memory, at least one memory, and the like. In some implementations, the server may be configured on a virtual machine hosted on a physical processor(s).

Figure 2:
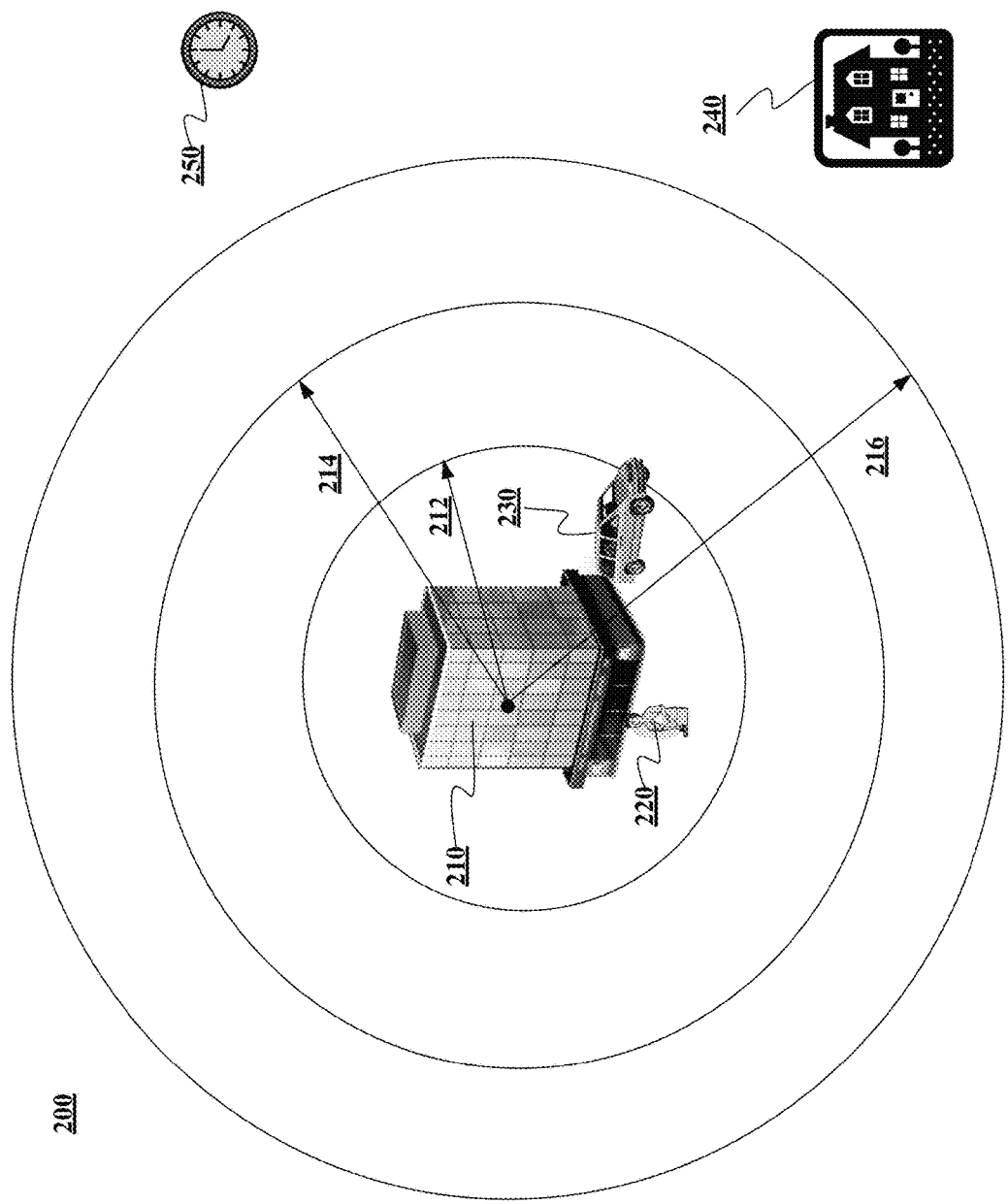
FIG. 2 depicts an example of locations and time used to determine whether to trigger an external service, in accordance with some implementations.

FIG. 2 depicts an example the movements of an employee, and locations and times that may be stored and used to determine whether to trigger an external service, in accordance with some implementations. Employee 220 may work for an employer at office building 210. Rules may determine when an external service may be triggered by the movements of employee 220 and the times of the movements. The times, locations, and other factors included in the rules may be stored at database 196. The rules applied to the current location of employee 220 and the current time 250 may determine whether an external service is triggered. Different outcomes may occur according to the locations of employee 220, the distances 212, 214, 216 from office building 210, and a corresponding time 250 for each movement. FIG. 2 refers to FIG. 1.

The following examples may be used for illustrative purposes. Employee 220 ("Janet") may carry mobile station 110 ("smartphone") wherever she goes. For example, Janet may carry her smartphone 110 to the office in the morning. When she arrives at the office building (GPS location of office stored in database 196), application 112 may clock-in Janet for work via application 112 and an external service interfaced to the timekeeping system. Janet may remain at office building 210 for the remainder of the work day. At 12:00 P.M. Janet may move from her office on the second floor to the fourth floor lunch room. Janet's position in office building may be tracked by one or more wireless access points inside the building. When Janet leaves her office for the lunch room the application 112 may clock-out Janet for lunch on the timekeeping system. When she returns to her office, application 112 may clock-in Janet again. When Janet leaves her office and then the building 210 at 4:00 P.M., application 112 may clock-out Janet for the day. As Janet approaches her car 230 in the parking lot, application 112 may start her car and the climate control inside the car via an external service that interfaces to the control of Janet's car. As Janet leaves the parking lot, application 112 may cause an external service to send a text message to Janet's spouse at home 240. When Janet gets to predetermined distances 212, 214, and 216, application 112 may cause an update message with Janet's location to Janet's spouse.

In the previous example, application 112 on the employee's mobile station 110 may determine whether to trigger the external service based on one or more rules. The one or more rules may include data values stored in database 196 and current or present values of location, time, and/or other factors at mobile station 110. A rule may be stored at database 196 or at mobile station 110.

Figure 3:
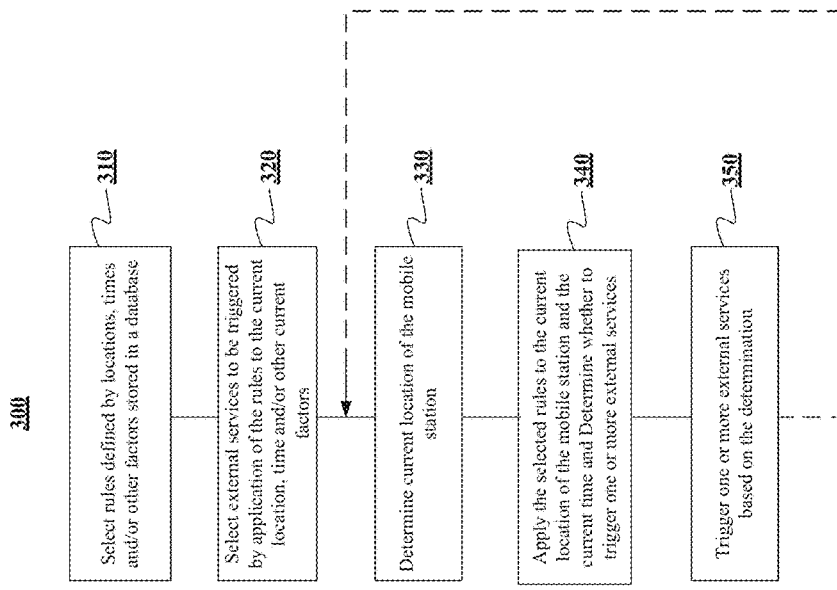
FIG. 3 depicts a process, in accordance with some implementations.

FIG. 3 depicts a process for triggering an external service based on at least a current location and rules defining whether to trigger the external service, in accordance with some embodiments. In some implementations, the process of FIG. 3 may be performed by a processor, memory, and executable code (also referred to herein as the "application"). At 310, one or more rules may be defined by locations, times, and/or other factors stored in a database. At 320, one or more external services may be selected to be triggered by the one or more rules. At 330, the location of a mobile station carried by a person/employee may be determined. At 340, the application may apply the one or more rules to the current location of the mobile station and the current time, and the application may determine whether to trigger the one or more external services. At 350, the one or more external services may be triggered. FIG. 3 refers to FIGS. 1 and 2.

At 310, one or more rules may be defined by locations, times, and/or other factors stored in a database. For example, stored locations may include the locations of an employer's offices, locations of clients, locations of vendors, employee residences, and/or any other locations that the employer may use in generating a rule. Stored times, may include work start times, work end times, break times, times the employee has scheduled to be absent, and/or any other time that the employer may use to generate a rule. An example of another factor may include speed of the mobile station in the employee's vehicle such as car 230. As an example of a rule, the employee may configure a rule that triggers an external service when the current location of the employee is outside an area around office building 210 and the current time 250 is 4:00 P.M. or later. Another example of a rule may include sending an email to the employer anytime the employee's mobile station exceeds 120 kph between 8:00 A.M. and 5:00 P.M.

At 320, external services may be selected to be triggered by the one or more rules. A rule may trigger one or more external services. Different rules may trigger different external services. Examples of external services include text messaging, emailing, voice telephone calls, timekeeping log-in and out, storage of information such as time, location, and/or other factors at database 196 or at mobile station 110. Any other external service for communicating, storing, or processing information may also be triggered.

At 330, the location of a mobile station carried by a person/employee may be determined. For example, the location of mobile station 110 may be determined by a global positioning system (GPS) receiver. Some mobile stations may be able to determine their location using information from one or more wireless access points. For example, a mobile station may use received signal strengths from one or more wireless access points to determine its location indoors or outdoors. Location may be determined using other methods as well such as the use of beacons that relay location information to the mobile station. The location of the mobile station 110 may be determined by the foregoing methods, a combination of the foregoing methods, or any other method of determining the location of a wireless device.

At 340, the application may apply the one or more rules to the current location of the mobile station and the current time and determine whether to trigger the external service. For example, a rule may be configured to send a text message to the employer when the speed of the mobile station exceeds 120 kph between the hours of 8:00 A.M. and 5:00 P.M. When the mobile station is travelling less than 120 kph, the text message (external service) may not be triggered. Only when the rule is satisfied (greater than 120 kph between hours of 8:00 A.M. an 5:00 P.M.) is a text message sent according to this example rule. At 350, the one or more external services may be triggered. In some implementations, the 310-350 may be repeated as long as the application is running or enabled on mobile station 110.

The subject matter disclosed herein may have the technical effect of improving the accuracy of timekeeping in an ERP system. For example, clocking-in and out an amployee based on their geo-location allows for precise tracking of time and location of an employee.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

Although a few variations have been described in detail above, other modifications are possible. For example, while the descriptions of specific implementations of the current subject matter discuss analytic applications, the current subject matter is applicable to other types of software and data services access as well. Moreover, although the above description refers to specific products, other products may be used as well. In addition, the logic flows depicted in the accompanying figures and described herein do not require the particular order shown, or sequential order, to achieve desirable results. Other implementations may be within the scope of the following claims.

What is claimed:

1. A method comprising:
   determining, by a mobile station, whether the mobile station complies with a condition of a rule defined by at least a location indicative of the location of the mobile station, a time indicative of the time associated with the location, a tolerance time providing a variation in the time, and a tolerance location providing a variation of the location, wherein the determining of the condition further comprises determining that the location matches a work location within the variation provided by the tolerance location and determining that the time matches the scheduled work time within the variation provided by the tolerance time;
   selecting, in response to determining that the mobile station complies with the condition of the rule including the time, the location, the tolerance time, and the tolerance location, a timekeeping service for tracking when a user of the mobile station arrives and departs from the location associated with the work location for the user of the mobile station, wherein an enterprise resource planning system includes the timekeeping service coupled to a wireless network node configured to communicate with the mobile station;
   triggering, in response to selecting the timekeeping service, the timekeeping service to indicate an arrival and/or a departure of the user of the mobile station at the matching location at the matching time, wherein the matching location matches the work location within the variation indicated by the tolerance location and the matching time matches the scheduled work time within the variation indicated by the tolerance time; and
   inhibiting the triggering of the time keeping service for the departure, when an electronic calendar for the user indicates the departure is for a work event.

2. The method of claim 1, wherein the timekeeping service is triggered by sending a text message, an email, and/or a voice call, wherein the method further comprises allowing the triggering of the time keeping service for the departure, when the electronic calendar for the user indicates the departure is not for a work event.

3. The method of claim 1, wherein the determining, by a mobile station, whether the mobile station complies with the condition of the rule, further comprises determining compliance with a speed of the mobile station.

4. The method of claim 1, wherein the mobile station is a user equipment.

5. A non-transitory computer readable medium containing executable instructions, that when executed by at least one processor perform operations comprising:
- determining, by a mobile station, whether the mobile station complies with a condition of a rule defined by at least a location indicative of the location of the mobile station, a time indicative of the time associated with the location, a tolerance time providing a variation in the time, and a tolerance location providing a variation of the location, wherein the determining of the condition further comprises determining that the location matches a work location within the variation provided by the tolerance location and determining that the time matches the scheduled work time within the variation provided by the tolerance time;
- selecting, in response to determining that the mobile station complies with the condition of the rule including the time, the location, the tolerance time, and the tolerance location, a timekeeping service for tracking when a user of the mobile station arrives and departs from the location associated with the work location for the user of the mobile station, wherein an enterprise resource planning system includes the timekeeping service coupled to a wireless network node configured to communicate with the mobile station;
- triggering, in response to selecting the timekeeping service, the timekeeping service to indicate an arrival and/or a departure of the user of the mobile station at the matching location at the matching time, wherein the matching location matches the work location within the variation indicated by the tolerance location and the matching time matches the scheduled work time within the variation indicated by the tolerance time; and
- inhibiting the triggering of the time keeping service for the departure, when an electronic calendar for the user indicates the departure is for a work event.

6. The non-transitory computer readable medium of claim 5, wherein the timekeeping service is triggered by sending a text message, an email, and/or a voice call, wherein the user equipment allows the triggering of the time keeping service for the departure, when the electronic calendar for the user indicates the departure is not for a work event.

7. The non-transitory computer readable medium of claim 5, wherein the determining, by a mobile station, whether the mobile station complies with the condition of the rule, further comprises determining compliance with a speed of the mobile station.

8. The non-transitory computer readable medium of claim 5, wherein the mobile station is a user equipment.

9. A system compromising:
- at least one processor; and
- at least one memory including instructions that when executed by the at least one processor provide operations comprising:
- determining, by a mobile station, whether the mobile station complies with a condition of a rule defined by at least a location indicative of the location of the mobile station, a time indicative of the time associated with the location, a tolerance time providing a variation in the time, and a tolerance location providing a variation of the location, wherein the determining of the condition further comprises determining that the location matches a work location within the variation provided by the tolerance location and determining that the time matches the scheduled work time within the variation provided by the tolerance time;
- selecting, in response to determining that the mobile station complies with the condition of the rule including the time, the location, the tolerance time, and the tolerance location, a timekeeping service for tracking when a user of the mobile station arrives and departs from the location associated with the work location for the user of the mobile station, wherein an enterprise resource planning system includes the timekeeping service coupled to a wireless network node configured to communicate with the mobile station;
- triggering, in response to selecting the timekeeping service, the timekeeping service to indicate an arrival and/or a departure of the user of the mobile station at the matching location at the matching time, wherein the matching location matches the work location within the variation indicated by the tolerance location and the matching time matches the scheduled work time within the variation indicated by the tolerance time; and
- inhibiting the triggering of the time keeping service for the departure, when an electronic calendar for the user indicates the departure is for a work event.

10. The system of claim 9, wherein the timekeeping service is triggered by sending a text message, an email, and/or a voice call, wherein the user equipment allows the triggering of the time keeping service for the departure, when the electronic calendar for the user indicates the departure is not for a work event.

11. The system of claim 9, wherein the determining, by a mobile station, whether the mobile station complies with the condition of the rule, further comprises determining compliance with a speed of the mobile station.

12. The system of claim 9, wherein the mobile station is a user equipment.

* * * * *